R. W. THIBODEAU.
SIGNAL FOR AUTOMOBILES.
APPLICATION FILED DEC. 8, 1915.

1,213,709.  Patented Jan. 23, 1917.

Witnesses
J H Crawford

Inventor
R. W. Thibodeau,
By Victor J. Evans
Attorney

UNITED STATES PATENT OFFICE.

RALPH W. THIBODEAU, OF QUINCY, MASSACHUSETTS.

SIGNAL FOR AUTOMOBILES.

1,213,709.  Specification of Letters Patent.  Patented Jan. 23, 1917.

Application filed December 8, 1915. Serial No. 65,789.

*To all whom it may concern:*

Be it known that I, RALPH W. THIBODEAU, a citizen of the United States, residing at Quincy, in the county of Norfolk and State of Massachusetts, have invented new and useful Improvements in Signals for Automobiles, of which the following is a specification.

The present invention provides novel signaling means for motor vehicles to give ample warning so as to avoid collisions or accidents and is of such construction as to be readily attached to motor vehicles of any design, whether intended for passenger service or for hauling loads.

The invention provides an appliance embodying a signal, a lamp circuit connecting the signal with the steering mechanism of a motor vehicle whereby causing the illumination of the signal to give warning of the intention of the operator of the vehicle making a turn either to the right or the left, so that the driver of a vehicle in the rear may be advised of the intention of the driver of the vehicle ahead and govern himself accordingly so as to prevent a rear end collision.

A still further object of the invention is the provision of a device of the above stated character wherein the circuit closing member is so mounted upon the steering mechanism of the vehicle to permit of the closing of a circuit upon the turning of the steering wheel in either direction and further permitting of the turning of the steering wheel in a further direction after the circuit has been closed.

With the above and other objects in view, the invention consists of the novel features, details of construction and combination of parts which will hereinafter be more fully set forth, illustrated in the accompanying drawing and pointed out in the appended claim.

Figure 1:
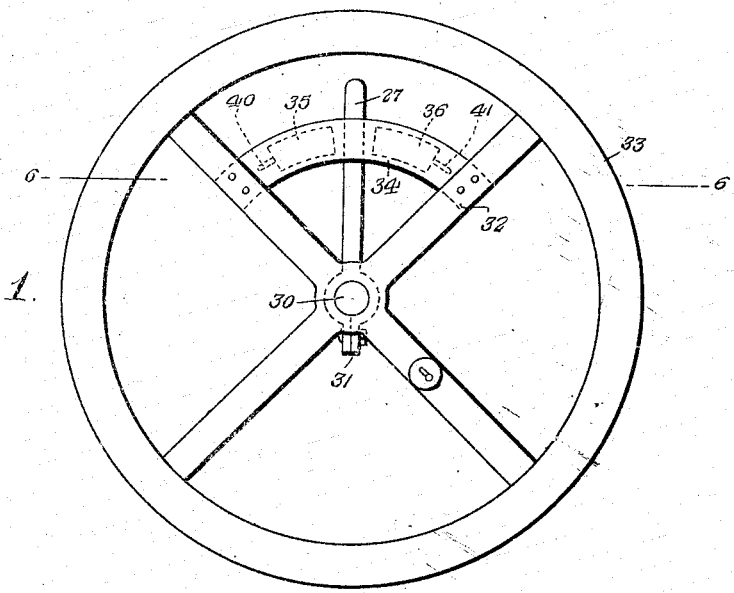
Figure 2:
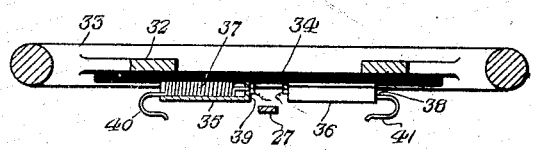
Figure 3:
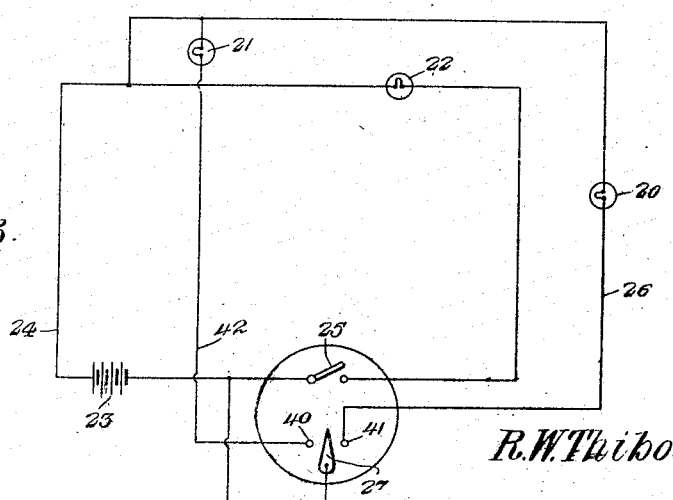

In the drawings: Figure 1 is a plan view of the steering wheel; Fig. 2 is a section taken on line 6—6 of Fig. 1; and Fig. 3 is a diagrammatic view of the wiring.

In order at this time to have a more clear understanding of the invention, it is to be briefly stated that the lamps 20 and 21 are adapted to be alternately illuminated to give warning of the intention of the operator of the vehicle about to make a turn to either the right or to the left in order that the driver of the vehicle in the rear may be advised of the intention of the driver ahead, so as to prevent a rear end collision, while the tail light not shown and number plates not shown are to be illuminated through the medium of the lamp 22 as is customary to give warning to the driver of the vehicle in rear that another vehicle is in advance and further preventing rear end collisions.

The illuminating mechanism for both the indicator and the signals comprises a battery 23 having the lamp 22 located in the circuit 24 adapted to be closed through the medium of the hand switch 25, while arranged in the circuit 42 is the lamp 21 and arranged in the circuit 26 is the lamp 20 adapted to be alternately illuminated through the medium of the contact finger 27 alternately engaging with the respective contacts 40 and 41.

The controlling means for causing the alternate illumination of the signal embodies the stationary column 30 of the usual steering post of a motor vehicle and having rigidly connected thereto through the medium of a clamp 31 the contact finger 27. Rigidly connected to the under surface of a pair of spokes 32 of the steering wheel 33, between the plane of which the contact finger 27 extends, is a panel plate 34, made of insulating material such as fiber or the like and having mounted thereon a pair of alined housings 35 and 36. Mounted in the housings 35 and 36 of the panel plate 34 are expansible spring contacts 37 and 38 arranged at right angles with respect to the steering column and having their inner terminals extended through the closed end wall 39 of the housings 35 and 36 and permanently connected therewith through the medium of a nut. The free ends of the yieldable spring contacts 37 and 38 are formed with hooked ends 40 and 41. These hooked ends 40 and 41 are disposed oppositely of and in alinement with the plane of the contact finger 27, and as will be clearly understood when the wheel 33 is turned, for example, in a direction toward the left, the contact finger 27 will engage with the hooked end 40 of the spring contact 37, and complete the circuit and illuminate the lamp 21, indicating to the driver of the vehicle in the rear that the vehicle ahead is about to make a sharp turn to the left, then, should it be found necessary to revolve the wheels 33 for a further turning movement in the same direction, or to the left, then the yieldable spring contact 37 will be stretched and still the circuit will remain closed until the vehicle is approximately in a direct straight path of travel. It is obvious that when it is found necessary to make a turn in the opposite direction, or in a direction toward the right, the contact finger 27 will engage with the hooked end 41 completing the circuit and illuminating the lamp 20, and this spring contact 30 has the same functional character as that of the spring contact 37, therefore, a repetition of the action of the contact is believed to be unwarranted.

From the foregoing description, taken in connection with the accompanying drawing, the advantages of construction and of the method of operation will be readily apparent to those skilled in the art to which the invention relates, and while I have described the principles of operation of the device together with the device which I now consider to be the best embodiment thereof, I desire to have it understood that the device shown is merely illustrative and that such advantages may be made when desired as are within the scope of the claim appended thereto.

I claim:—

A steering wheel controlled switch embodying a contact finger stationarily mounted upon the steering column, a panel plate secured to the underneath surface of the steering wheel, a pair of yieldable contacts housed within the panel plate and provided with protruding hooked extremities, said contact finger adapted to alternately engage with the hooked extremities of the yieldable contacts upon movement of the steering wheel in opposite directions.

In testimony whereof I affix my signature in presence of two witnesses.

RALPH W. THIBODEAU.

Witnesses:
WILLIAM R. CAULFIELD,
LESTER W. WOLFE.